April 27, 1965  J. F. HERRMANN  3,180,207
VIEWING DEVICE FOR MICROFILM STRIP
Filed Aug. 3, 1961  2 Sheets-Sheet 2
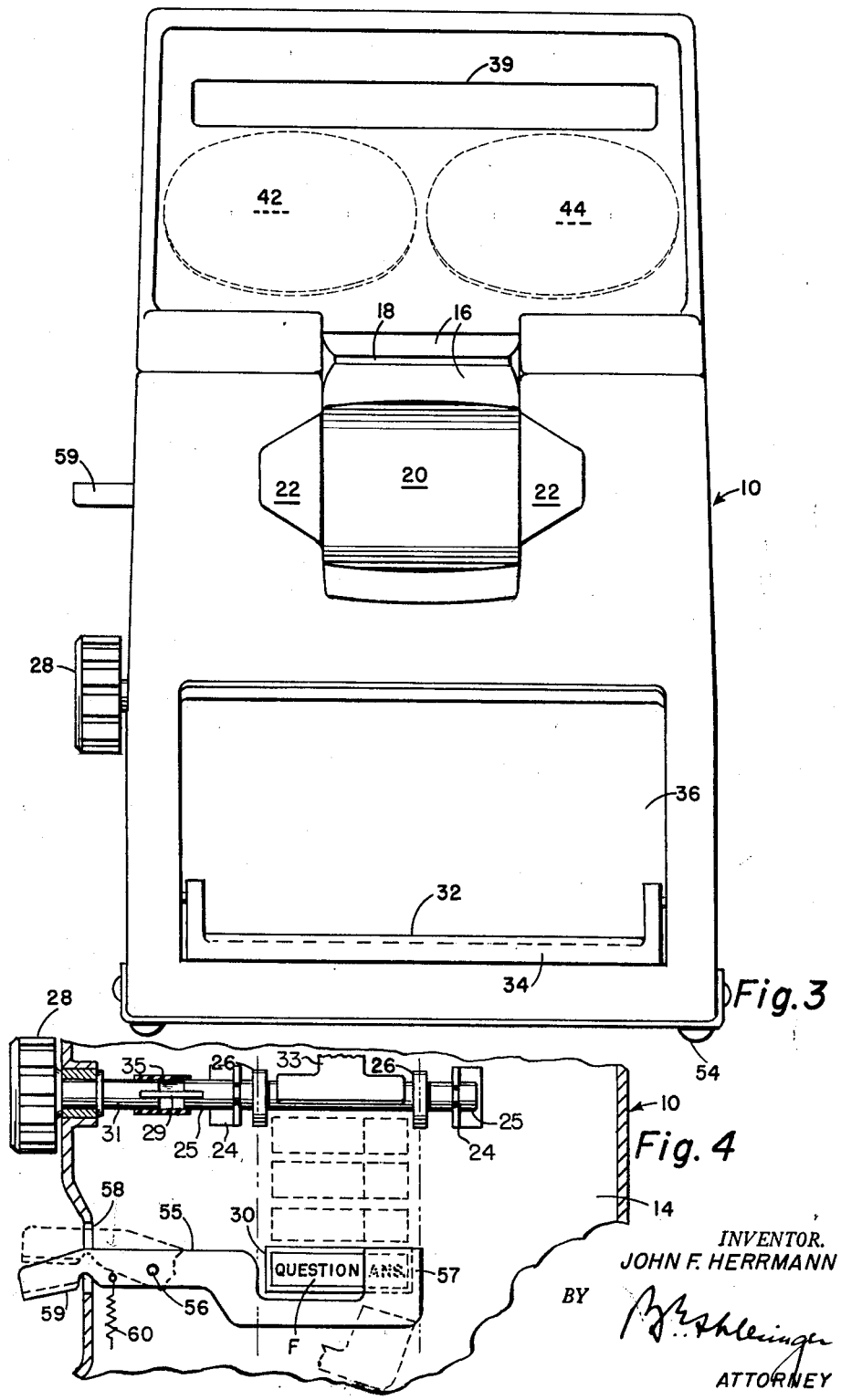
INVENTOR.
JOHN F. HERRMANN
BY
ATTORNEY

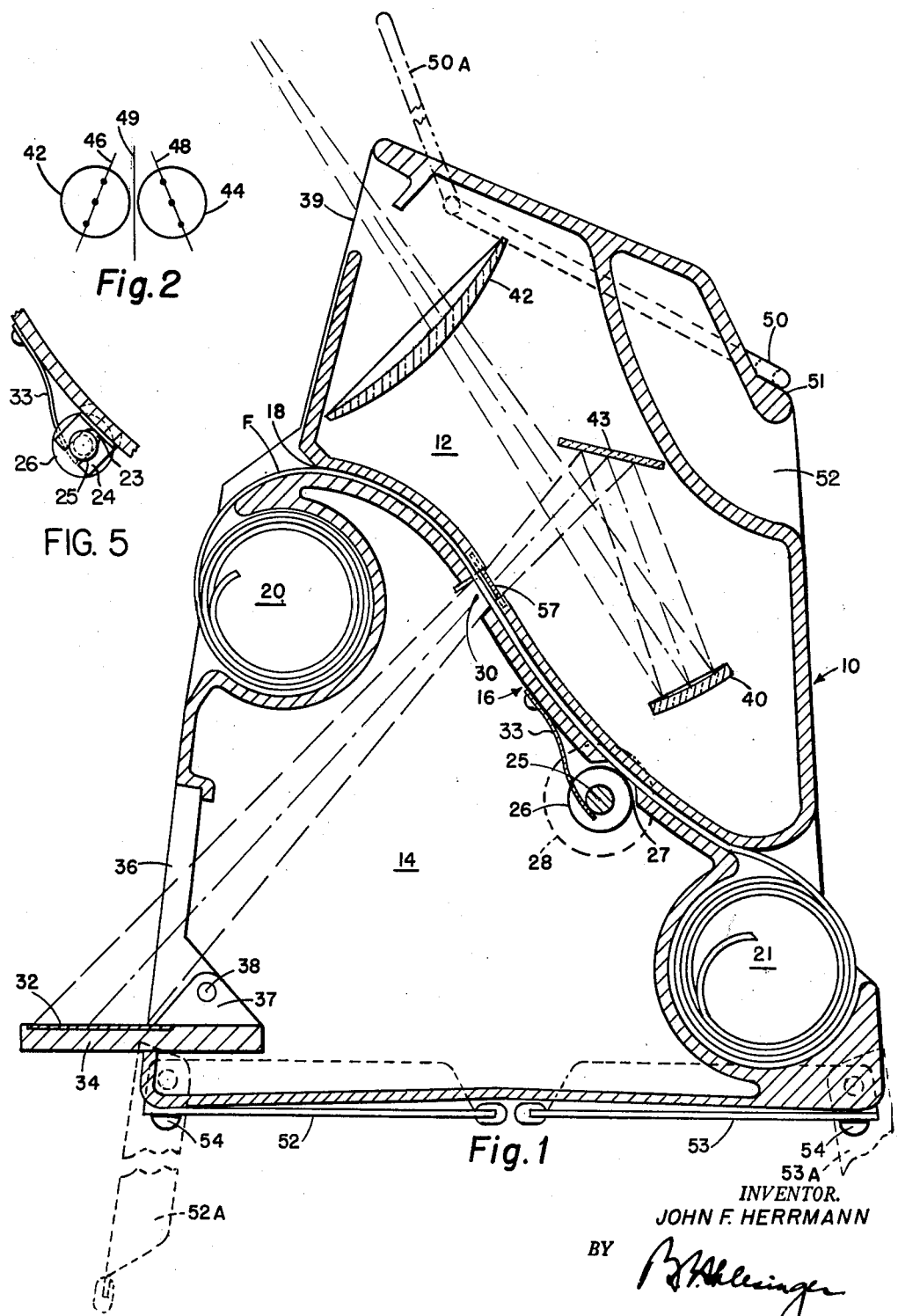

United States Patent Office 3,180,207
Patented Apr. 27, 1965

3,180,207
VIEWING DEVICE FOR MICROFILM STRIP
John F. Herrmann, Pittsford, N.Y., assignor to Graflex, Inc., Rochester, N.Y., a corporation of New York
Filed Aug. 3, 1961, Ser. No. 129,115
4 Claims. (Cl. 88—1)

This invention relates to a novel viewing device for educational or recreational purposes and more particularly to a novel viewing device of the kind known as a microfilm reader.

Present day emphasis on improved mass teaching techniques is concerned to a large extent with the problem of presenting a mass of material to a large number of students at reasonable cost. One desirable and relatively inexpensive method is by way of microfilm techniques. Microfilm has the advantages of being relatively inexpensive, extremely compact, long lasting, and highly flexible in that its content can be readily changed or rearranged by splicing. It is often desirable to provide for simultaneous individual use of microfilms by each student in a class. Heretofore, however, this has not been practicable on a large scale because of the relatively high cost of previously available microfilm viewing devices.

Accordingly, one important object of the present invention is to provide a novel microfilm reader or viewer which is especially suitable for educational purposes and which can be produced and sold at relatively low cost.

Another object is to provide a novel microfilm reader or viewer which uses ambient light for illumination and requires no artificial light source.

A further object is to provide a novel microfilm reader or viewer which is self-supporting and convenient to use and which is of relatively simple and inexpensive construction, yet rugged and trouble-free, and long-lasting in service.

Other objects of the invention will be apparent hereinafter from the description of a presently preferred embodiment thereof, and from the recital of the appended claims, particularly when taken in conjunction with the accompanying drawings, wherein:

FIG. 1 is a vertical sectional view of a microfilm reader or viewer made according to one embodiment of the present invention;

FIG. 2 is a schematic diagram showing the orientation of the pair of cylinder lenses in the optical viewing system of this reader or viewer;

FIG. 3 is a front elevational view of this reader or viewer;

FIG. 4 is a fragmentary sectional view of the reader or viewer taken in a plane transverse to the plane of FIG. 1 and showing the film advancing means and the shutter for partially masking the film; and FIG. 5 is a fragmentary section in a plane parallel to the plane of FIG. 1 showing the means for resiliently holding the drive rollers in engagement with the film strip.

In the embodiment of the invention illustrated, the film strip in coil form is positioned in a compartment at the front of the viewer, and is fed over a film gate to a take-up compartment at the rear of the viewer where the natural curl of the film will wind it automatically into a coil. As each frame of the film is registered with the film gate it may be viewed by looking through a viewing opening in the top front of the device. A mirror system and a pair of lenses magnify the frame so that it can readily be seen. The frame at the film gate is illuminated by a reflecting mat illuminating surface on a door, hinged in the lower front of the viewer, which directs ambient light onto the frame. A manually-movable mask may be provided so that a part of each frame can be covered when the frame is at the film gate so that the film strip can be used in a teaching system having questions and answers on juxtaposed portions of each film frame, as will be described further hereinafter.

Referring now to the drawings by numerals of reference, the microfilm reader shown includes a unitary, relatively compact housing 10, which may be conveniently die-cast of metal, or molded of plastic. The housing 10 is divided into upper and lower portions 12 and 14, respectively, by an integral internal wall 16, which slopes downwardly from the front of the housing toward the rear. A film guideway 18 is formed medially within the wall 16, extending along the full length thereof, and opening both at the front and at the rear of the housing.

Generally cylindrical recesses or pockets 20 and 21 are formed in the front and rear walls of the housing, respectively, adjacent to the respective ends of the guideway 18 for holding and retaining the film strip in coiled form. Tapered access indentations 22 are formed in the front wall of the housing 10 adjacent to and at opposite sides of the cylindrical film-receiving recess 20 for convenience in placing a roll of film F in the cylindrical recess 20. Similar indentations may be provided at opposite sides of the rear recess 22.

Journaled at opposite ends in the slots 23 of trunnions 24 which are secured to guide wall 16 is a shaft 25 to which there are secured a pair of axially spaced rubber drive rollers 26. These project into the film guideway 18 through laterally-spaced openings 27 in the lower portion of the wall 16 to engage and feed a film strip through the guideway. The rollers 26 are resiliently held in driving engagement with the film strip by a leaf spring 33 that is fastened at one end to the lower side of guide wall 16 and that engages the periphery of shaft 25 between the rollers 26. Shaft 25 is connected by a leaf spring 29 with a shaft 31. Shaft 31 is manually rotatable, to effect the film feed, by means of a knob 28 which is secured to the shaft 31 exteriorly of the housing. Spring 29 permits movement of shaft 25 relative to shaft 31 under pressure of leaf spring 33. A rubber sleeve 35 protects spring 29.

A film gate aperture 30 of a size equal to a single picture frame of the film strip F is formed in the interior wall 16, and provides the only internal means of light transmission between the upper and lower housing portions 12 and 14, respectively.

For maximum convenience and for minimum expense, both initially and in operation, the microfilm reader of the present invention is designed for illumination by ambient light. In the embodiment illustrated such light is directed generally upwardly into the lower housing portion 14 toward the film gate 30 by a diffusely reflecting illuminating surface 32, which is carried by a door 34 hinged in an aperture 36 in the lower front wall of the housing. The door is provided with ears 37 at opposite sides which are pivoted on pins 38 adjacent to but above its lower edge. The arrangement permits opening of the door 34 merely by pushing upon it along its lower edge, thus eliminating the requirement for a handle or other opening device.

The illuminating surface 32 is preferably a buff-colored surface and may be simply a sheet of paper. I have found that when the door 34 is open such a sheet will reflect the ambient light into the housing and will provide all the illumination required to read the frame of film at the film gate 30. When the door 34 is swung to its generally vertical position closing the aperture 36, the diffusely reflecting surface 32 faces inwardly into the housing, and is thereby protected from dust and damage when the reader is not in use. Instead of using a door, however, the reflecting mat might be mounted on a fixed projection extending forwardly from the housing at the same level as the open door.

The housing has a rectangular viewing slot 39 in its upper front wall through which a person can view the frame of film at the film gate.

The principal elements of the viewing optical system, which is arranged for binocular viewing, and which is mounted in the upper portion 12 of the housing, are a concave spherical mirror 40 and a pair of juxtaposed cylindrical lenses 42 and 44. Mounted between lenses 42 and curved mirror 40, but out of the light path, is a flat reflecting mirror 43. Light from the film gate 30 is reflected by the plane mirror 43 to the concave mirror 40, which is mounted near the lower end and at the rear of the upper housing portion 12. The concave mirror 40 enlarges and directs the light beam through the cylinder lenses 42 and 44 toward the viewing slot 39. The cylinder lenses 42 and 44 are of relatively low power, and are mounted in the housing 10 in juxtaposed position adjacent to the slot 39 with their cylinder axes 46 and 48 inclined away from a mean vertical plane 49 between them as shown in FIG. 2. As best seen in FIG. 1 the cylinder lenses 42 and 44 are inclined relative to the viewing direction and so mounted that it is only a portion of each which is aligned with the viewing slot 39. It is the image reflected by flat mirror 43 onto the curved mirror 40 then which is viewed through cylinders 42 and 44. This arrangement has been found to provide fully adequate compensation, in view of the natural accommodation of the human eye, for the image distortion and mis-registration ordinarily encountered when attempting to use a single concave mirror for binocular viewing with magnification.

A head rest 50, which may be made of wire or of molded plastic, is pivoted at the top of the housing 10 to assist the user in properly positioning his eyes and to improve comfort during relatively prolonged viewing periods. For storage, the head rest 50 is swung rearwardly and downwardly and rests upon the ledge 51 formed on the outside of the housing. For use, the head rest is swung upwardly and forwardly for supporting the user's forehead. Any convenient stop arrangement such as a shoulder (not shown) molded into the housing wall may be provided for limiting the forward movement of the headrest 50. A recess 52, which is molded into the rear wall of the housing near the upper end thereof, provides a hand hold for lifting and carrying the viewer.

A pair of folding legs 52, and another pair of folding legs 53 may be hingedly mounted at the bottom of the housing at front and back thereof, respectively, for raising the viewer to a comfortable reading height. When the reader is not in use, the legs 52 and 53 may be folded compactly against the bottom of the housing 10 for compact storage. Rubber tipped feet 54 are also provided on the bottom of the housing for resting the housing on a desk or table.

In many teaching systems it is desired to present information to students in question and answer form, the question being presented first, and the correct answer being presented only after the student has prepared his own answer.

The viewer of the present invention lends itself admirably to the presentation of a sequential constructed-answer teaching program. Film strip may be provided, each frame of which contains a question and its answer. The answer is concealed by a shutter or mask until the student has, for instance, written down the answer on a paper; and then the shutter or mask may be tripped to reveal the answer. As shown in FIG. 4, the microfilm reader illustrated is equipped with a spring-biased mask or shutter which is in the form of an arm 55 that is pivoted at 56 on one side wall of the housing or film track. This arm has an enlarged portion at one end which constitutes a mask 57 adapted to cover the answer portion of a frame of microfilm when the frame is in registry with the film gate 30. At its other end the arm projects through an opening 58 in one side wall of the housing and has a handle portion 56 whereby the mask portion 57 may be manually swung out of the way to expose the entire frame to view. The question part of the teaching material would normally be placed on that portion of each frame of the film strip which appears in the unmasked part of the film gate 30. The answer part of the teaching material would be placed on that portion of the frame which passes through the normally masked part of the film gate 30. A catch (not shown) may be provided for retaining the mask 54 in its opened position when it is desired to view an entire frame simultaneously, as would be desired, for example, when the microfilm reader is used for viewing entertainment type film strips or film strips of ordinary scenic views.

In one embodiment of the invention the overall height of the reader is about eight inches, the concave mirror 40 has a radius of curvature of about eight and three tenths inches and is optically spaced about three and three quarters inches from the film gate 30. The cylinder lenses 42 and 44 are of one quarter diopter power, and are optically spaced about four inches from the concave mirror 40. It will thus be seen that the viewers may be very compact and relatively inexpensive.

The mountings for the lenses 42 and 44 and for the mirrors 43 and 40, although not shown herein, may be integrally molded as part of the housing 10. Due to the natural accommodation of the human eye, close tolerances are not required in the viewing system, and fully adequate precision of positioning the various elements is readily achievable through modern molding techniques.

In use, film strip F wound in a coil is placed initially in the front recess 20. The leading end of the film strip F is inserted manually into the guideway 18, and the film strip is pushed through the guideway 18 until it comes into contact with the rollers 26. The shaft 25 may thereafter be rotated to advance the film toward the take-up compartment 21. As the film strip emerges from the rear of the guideway 18, it enters and coils itself within this rear take-up compartment. The door 34 is opened to illuminate the frame of film which is in registry with the film gate 30. The viewer takes a position with his or her eyes at a convenient location in alignment with the reading slot 39 and with the cylinder lenses 46 and 44. If the teaching system described is being used, the viewer reads the question on the film frame in the film gate 30, writes his or her answer down on a pad, for instance, and then trips the shutter arm 55 to disclose the answer given on the film frame, and then is able immediately to check the accuracy of his or her answer. The knob 28 is then turned to advance the next frame into view; and the same procedure is followed as to question and answer. To center a frame in the film gate knob 28 may be turned in the required direction. When the whole film has been viewed, the film may be removed from the take-up compartment 21, and a new film strip may be placed in supply compartment 20 and advanced as before.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A viewing device for microfilm strip comprising
   (a) a housing having front and back walls and
   (b) a pair of confronting walls extending between said front and back walls and spaced from each other to define a film guideway between them,
   (c) said guideway opening at opposite ends thereof, both at said front wall and at said back wall,
   (d) said confronting walls each having an aperture intermediate its ends,
   (e) said apertures being in register with each other and defining a film gate equal in size to a single frame of the film and permitting the passage of light through said confronting walls from the lower part of said housing to its upper part,
   (f) means for admitting ambient light into the lower part of said housing and directing it toward said gate,
   (g) said front and back walls each having an outwardly open cylindrical recess adjacent to said guideway for receiving and holding a coil of the film strip,
   (h) a manually rotatable friction drive member disposed intermediate the ends of said guideway and projecting through one of said confronting walls for advancing a film strip through said guideway,
   (i) the front wall of said housing having a viewing opening therein, through which the user of the device may look, and
   (j) optical means for directing the light which passes through said gate toward and through said viewing opening, thereby to direct the image of the frame in said gate to said viewing opening.

2. A viewing device for microfilm strip comprising
   (a) a housing having front and back walls and
   (b) a pair of confronting walls extending between said front and back walls and spaced from each other to define a film guideway between them,
   (c) said guideway opening at opposite ends thereof both at said front wall and at said back wall,
   (d) said confronting walls each having an aperture intermediate its ends,
   (e) said apertures being in register with each other and defining a film gate equal in size to a single frame of the film and permitting the passage of light through said confronting walls from the lower part of said housing to its upper part,
   (f) means for admitting ambient light into the lower part of said housing and directing it toward said gate,
   (g) magnifying optical means in the upper part of said housing for viewing said gate,
   (h) said optical means including a pair of cylindrical lenses arranged with their major cylinder axes at an acute angle relative to each other and
   (i) a single spherically curved reflector optically between both of said lenses and said film gate,
   (j) said front and back walls each having an outwardly open cylindrical recess adjacent to said guideway for receiving and holding a coil of film strip, the opening in each of said recesses being large enough to permit the insertion or withdrawal of a coil of film strip in a radial direction relative to the axis of a respective recess,
   (k) a manually rotatable friction drive member disposed intermediate the ends of said guideway and projecting through one of said confronting walls for advancing a film strip through said guideway, and
   (l) said housing having an opening in the front wall through which the user of the device may look at said optical means, thereby to view the image of the frame then at said gate.

3. A viewing device for microfilm strip comprising
   (a) a housing having front and back walls and
   (b) a pair of confronting walls extending between said front and back walls and spaced from each other to define a film guideway between them,
   (c) said guideway opening both at said front wall and at said back wall,
   (d) said confronting walls each having an aperture intermediate its ends,
   (e) said apertures being in register with each other and defining a film gate equal in area to the area of a single frame of the strip, and permitting the passage of light through said confronting walls from the lower part of said housing to its upper part,
   (f) said front wall having an opening below said confronting walls for admitting ambient light into the lower portion of said housing,
   (g) a door hinged on said front wall at said opening,
   (h) the surface of said door that faces inwardly when said door is in its closed position being diffusely reflective, said surface facing upwardly when said door is in its open position, to reflect ambient light generally upwardly toward said film gate,
   (i) magnifying optical means in the upper part of said housing for viewing said gate,
   (j) said front and back walls each having an outwardly open cyclindrical recess beneath said guideway for receiving and holding a coil of film strip,
   (k) a manually rotatable friction drive member disposed intermediate the ends of said guideway and projecting through one of said confronting walls for advancing a film strip through said guideway, and
   (l) the front wall of said housing having a viewing opening therein through which the user of the device may look at said optical means, thereby to view the image of the frame then at said gate.

4. A viewing device for microfilm strip comprising
   (a) a housing having front and back walls and
   (b) a pair of confronting walls extending between said front and back walls and spaced from each other to define a film guideway between them,
   (c) said guideway opening both at said front wall and at said back wall,
   (d) said confronting walls each having an aperture intermediate its ends,
   (e) said apertures being in register with each other and defining a film gate equal in area to the area of a single frame of the film strip, and permitting the passage of light through said confronting walls from the lower part of said housing to its upper part,
   (f) means for admitting ambient light into the lower part of said housing and directing it toward said gate,
   (g) and a binocular magnifying viewing system mounted in the upper part of said housing for providing a magnified view of said gate,
   (h) said viewing system including a single concave mirror optically spaced from said gate a distance less than its focal length,
   (i) said concave mirror being mounted at the rear of said housing and facing generally forwardly and upwardly,
   (j) a plane mirror for reflecting light from said gate into said concave mirror, (k) an elongated viewing port extending generally horizontally across the upper front wall of said housing for binocular viewing of said concave mirror, (l) and a pair of cylinder lenses mounted in juxtaposed relation in said housing adjacent to said port for compensating for the difference in the viewing angles of a user's right and left eyes, (m) said lenses being positioned respectively in the lines of sight between the user's right and left eyes and said concave mirror and having their cylinder axes inclined relative to each other.

References Cited by the Examiner

UNITED STATES PATENTS

| | | | |
|---|---|---|---|
| 1,759,409 | 5/30 | Lassiter | 88—1 |
| 1,972,019 | 8/34 | Kanolt | 88—1 |
| 2,137,601 | 11/38 | Abrams | 88—1 |
| 2,174,660 | 10/39 | Hirsh | 88—28 |
| 2,174,778 | 10/39 | Croft | 88—1 |
| 2,394,711 | 2/46 | Miesegaes | 88—1 |

FOREIGN PATENTS

| | | |
|---|---|---|
| 732,101 | 6/32 | France. |
| 25,351 | 10/32 | France. (1st add. to Pat. No. 538,350) |
| 875,974 | 7/42 | France. |

JEWELL H. PEDERSEN, *Primary Examiner.*